(12) United States Patent
Kinsella

(10) Patent No.: US 8,344,647 B2
(45) Date of Patent: Jan. 1, 2013

(54) CONVERTING DIMMER SWITCH AC OUTPUT DUTY CYCLE VARIATION INTO AMPLITUDE VARIATION

(76) Inventor: Patrick Michael Kinsella, Atlanta, GA (US)

( * ) Notice: Subject to any disclaimer, the term of this patent is extended or adjusted under 35 U.S.C. 154(b) by 1074 days.

(21) Appl. No.: 12/144,271

(22) Filed: Jun. 23, 2008

(65) Prior Publication Data

US 2009/0315477 A1 Dec. 24, 2009

(51) Int. Cl.
*H05B 37/02* (2006.01)
(52) U.S. Cl. ......... 315/291; 315/294; 315/307; 315/308
(58) Field of Classification Search .............. 315/209 R, 315/224, 225, 244–246, 291, 294, 307, 308; 323/222–225, 282–288
See application file for complete search history.

(56) References Cited

U.S. PATENT DOCUMENTS

| | | | |
|---|---|---|---|
| 947,781 A | 2/1910 | Babcock | |
| 1,496,449 A | 6/1924 | Briggs | |
| 2,821,639 A | 1/1958 | Bright et al. | |
| 3,299,320 A | 1/1967 | Kurata | |
| 3,393,326 A | 7/1968 | Candy | |
| 3,484,673 A | 12/1969 | Strobel | |
| 3,733,528 A | 5/1973 | Gilbreath | |
| 3,823,271 A | 7/1974 | Carbrey | |
| 3,849,607 A | 11/1974 | Carbrey | |
| 3,916,249 A | 10/1975 | Ackermann | |
| 3,935,505 A | 1/1976 | Spiteri | |
| 3,978,392 A | 8/1976 | Budrys et al. | |
| 4,287,468 A | 9/1981 | Sherman | |
| 4,327,309 A | 4/1982 | Wallot | |
| 4,633,161 A | 12/1986 | Callahan et al. | |
| 5,126,914 A | 6/1992 | Tada et al. | |
| 5,146,395 A | 9/1992 | McKie | |
| 5,319,301 A | 6/1994 | Callahan et al. | |
| 5,327,047 A | 7/1994 | Gershen | |
| 5,361,019 A | 11/1994 | Angott et al. | |
| 5,446,366 A * | 8/1995 | Bassett et al. ................. 323/222 |
| 5,481,211 A | 1/1996 | Vietze et al. | |
| 5,672,941 A | 9/1997 | Callahan et al. | |
| 5,729,120 A | 3/1998 | Stich et al. | |
| 5,844,792 A * | 12/1998 | Moreau .......................... 363/89 |
| 5,867,016 A | 2/1999 | Baur et al. | |
| 5,959,440 A | 9/1999 | Tobita et al. | |
| 6,018,221 A | 1/2000 | Ohtake | |
| 6,034,489 A | 3/2000 | Weng | |
| 6,137,242 A | 10/2000 | Chen | |
| 6,400,098 B1 | 6/2002 | Pun | |

(Continued)

FOREIGN PATENT DOCUMENTS

JP 56148172 B1 11/1981

*Primary Examiner* — Jimmy Vu

(57) ABSTRACT

A method of adapting the output of commercially available dimmer switches for use with non-incandescent light sources. Commercially available TRIAC and SCR based dimmers (62) output a waveform where AC output is varied based on user input by adjusting duty cycle (71), or the portion of the AC waveform that is output to the electrical load (76), having undesirable effects on non-incandescent loads. This output is fed into two alternately charging and discharging energy storage devices (72, 75), generating a modified AC waveform whose amplitude is proportional to the duty cycle percentage of the incoming AC waveform from the dimmer. Charge and discharge switching is handled by two switches (73, 74), triggered by the natural oscillation of the incoming AC waveform.

4 Claims, 9 Drawing Sheets

U.S. PATENT DOCUMENTS

Figure 4:
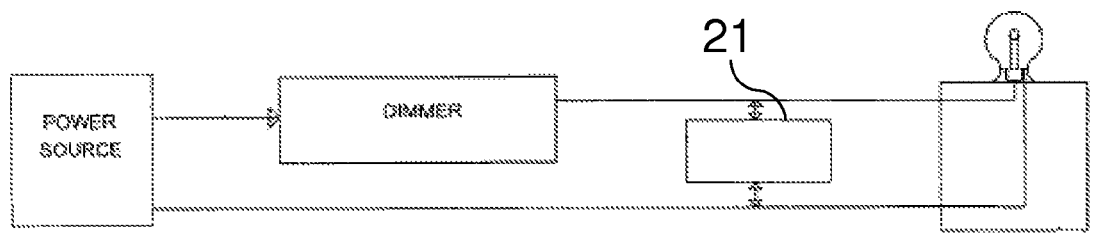

| | | |
|---|---|---|
| 6,900,617 B2 | 5/2005 | Duff, Jr. |
| 7,102,902 B1 | 9/2006 | Brown et al. |
| 7,199,562 B2 | 4/2007 | Muterspaugh |
| 7,245,110 B2 | 7/2007 | Duff, Jr. |
| 7,327,098 B2 | 2/2008 | Chen |
| 7,358,679 B2 * | 4/2008 | Lys et al. ........ 315/51 |
| 2005/0275354 A1 * | 12/2005 | Hausman et al. ...... 315/291 |
| 2008/0087902 A1 | 4/2008 | Lee et al. |

* cited by examiner

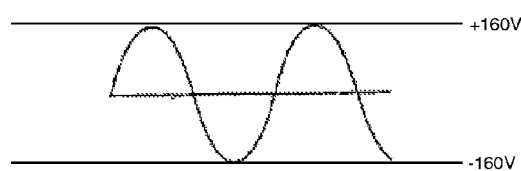
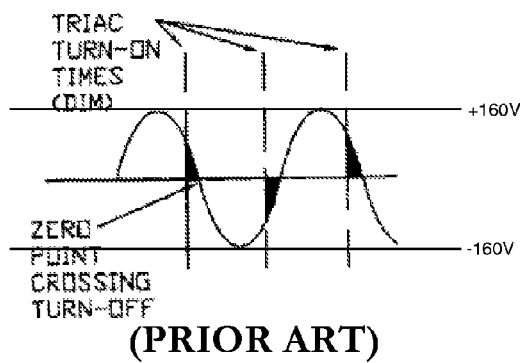
FIGURE 1
(PRIOR ART)
FIGURE 2
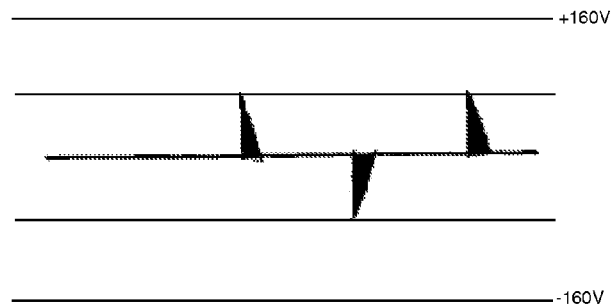
FIGURE 3

CONVERTING DIMMER SWITCH AC OUTPUT DUTY CYCLE VARIATION INTO AMPLITUDE VARIATION

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of the Invention

This invention relates to the use of alternating current (AC) dimmer switches with non-incandescent electrical loads.

2. Prior Art

The first electrical dimmer switches used resistive elements to reduce power flow in alternating current (AC) waveforms to the load, such as U.S. Pat. No. 1,496,449 to Briggs (1924). Due to the power loss in these switches, modern dimmer switches now relay on components called SCRs (Silicon Controlled Rectifiers) and TRIACs (TRIodes for Alternating Current) to control the output waveform. The most common of these systems involves switching of the TRIAC to the conductive state at some point on the AC waveform so that only a fraction of the complete waveform reaches the load, as seen in U.S. Pat. No. 4,287,468 to Sherman (1981). This altered or "chopped" waveform is very effective at dimming incandescent loads, but produces unwanted behavior in alternative light sources.

A solution has been developed to replace the dimmer switch with a modified dimmer switch, adding circuitry to operate with a specific load such as a fluorescent light (U.S. Pat. No. 3,935,505 to Spiteri (1976)), or an LED light source (U.S. Pat. No. 7,327,098 to Chen (2008)). This adds cost as it requires the addition of a modified dimmer switch, which can be a significant factor in a retrofit situation, based on the intent of using existing wiring and switches. A new development in LED technology for a semiconductor based light emitting device which can be driven directly by an AC power source (such as US patent application US2008/0087902) highlights the need for a cost effective method of retrofitting fixtures without changing any of the existing wiring and switching infrastructure, such as legacy dimmer switches.

Previous solutions have been developed to add features to an incandescent base to enhance operation of said incandescent bulb without changing existing wiring or switches, such as U.S. Pat. No. 3,916,249 to Ackermann (1975). Expanding this concept to non-incandescent loads, U.S. Pat. No. 7,102,902 to Brown/Lodhie (2006) details a device that can sit between the dimmer switch and LED light source (specifically as part of the LED lamp base or fixture) to enhance compatibility with conventional TRIAC dimmers. The Brown/Lodhie invention provides a method of creating a sufficient load near the zero point on the AC waveform to allow the TRIAC to switch off properly, enabling the dimmer switch to output a waveform similar to how it would with an incandescent load, without wasting power as the load is only present near the zero point on the AC waveform. While this is successful at shunting leakage current away from the load (so that it is not lit or energized when the dimmer switch is off and at allowing the TRIAC dimmer to shut off at the proper times, this design suffers from two disadvantages:

A) It does not provide a large, linear range of dimming as many non-incandescent light sources (such as LEDs) have minimum turn-on voltages, not allowing the light source to conduct (and hence emit light) below a certain threshold on the dimmer switch, frequently more than halfway up to a 100% brightness setting.

B) It does not provide smooth light output in a "dimmed" state as non-incandescent light sources (such as LEDs) are very responsive to "choppy" AC waveforms such as the output of a TRIAC dimmer, resulting in a flicker at certain light output levels.

A solution is needed to modify the incoming "chopped" AC waveform from a commercially available dimmer switch, which is based on duty cycle as a percentage of total sine wave, into a proportional amplitude varied waveform (such as what used to be output by a resistive dimmer) allowing for smooth, linear dimming over a large range of user selectable light output levels with no flicker or interference wherein inconsequential power is used or wasted in the conversion.

SUMMARY

In accordance with one embodiment, a method of converting the duty cycle varied output of an alternating current dimmer switch into an amplitude varied alternating current waveform where the average amplitude is proportional to the input waveform's duty cycle.

DRAWINGS—FIGURES

FIG. 1 shows a standard 120V (RMS) AC 60 Hz sine wave, unmodified by a dimmer

Figure 5:
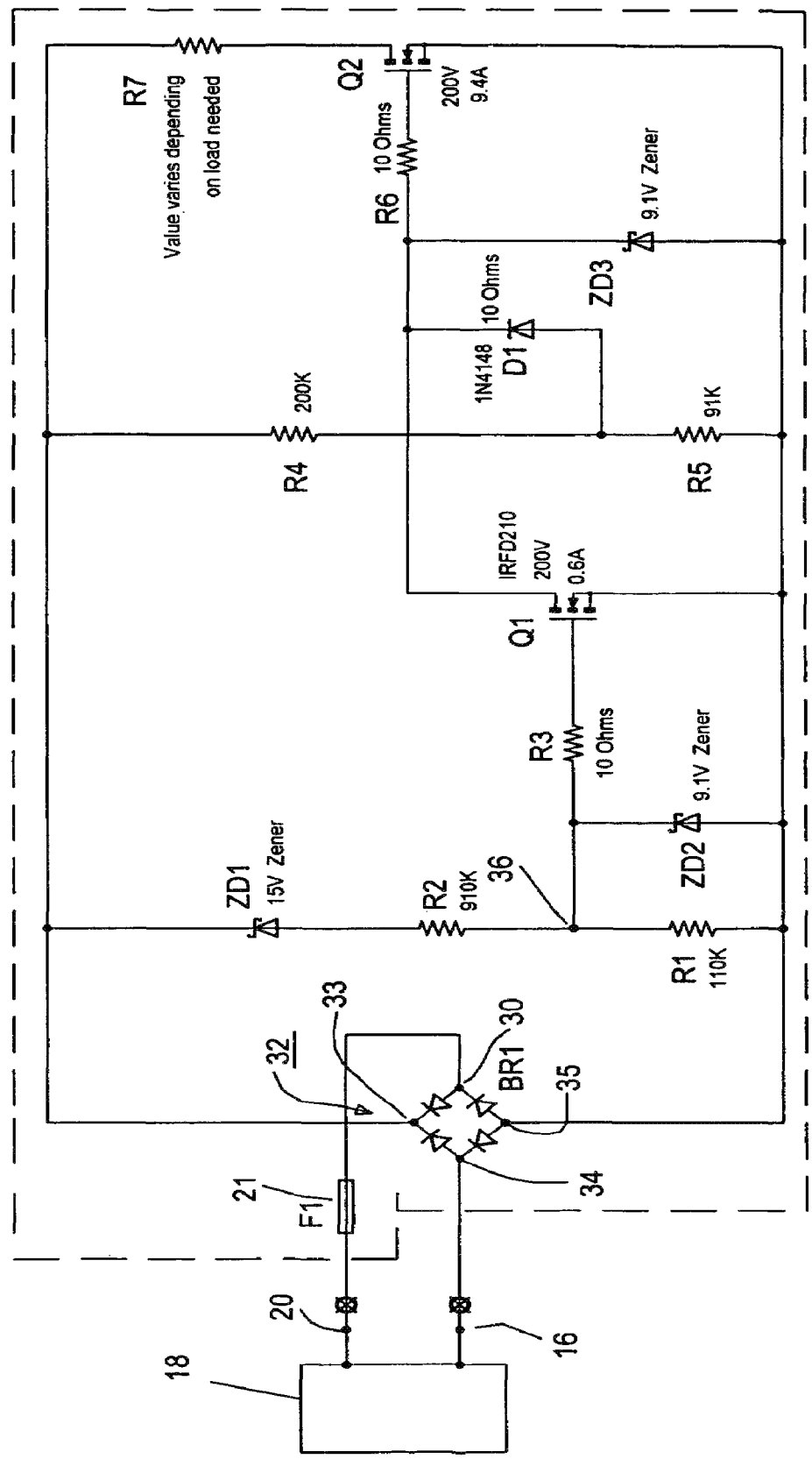
Figure 6:
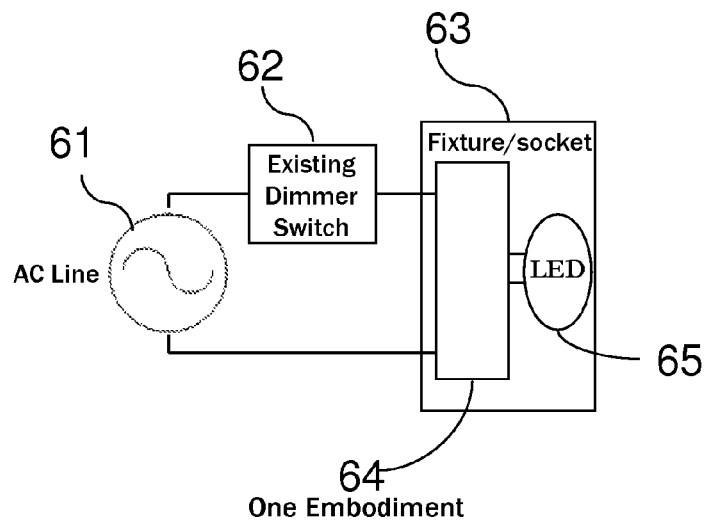
Figure 7:
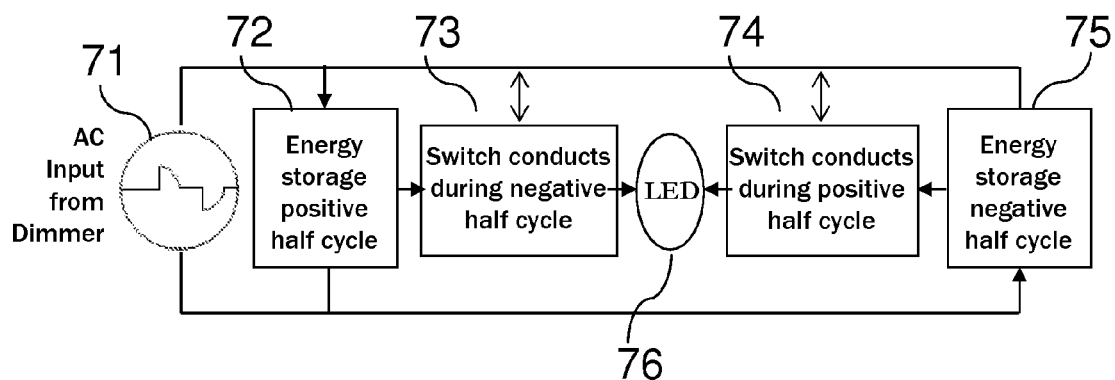
Figure 8:
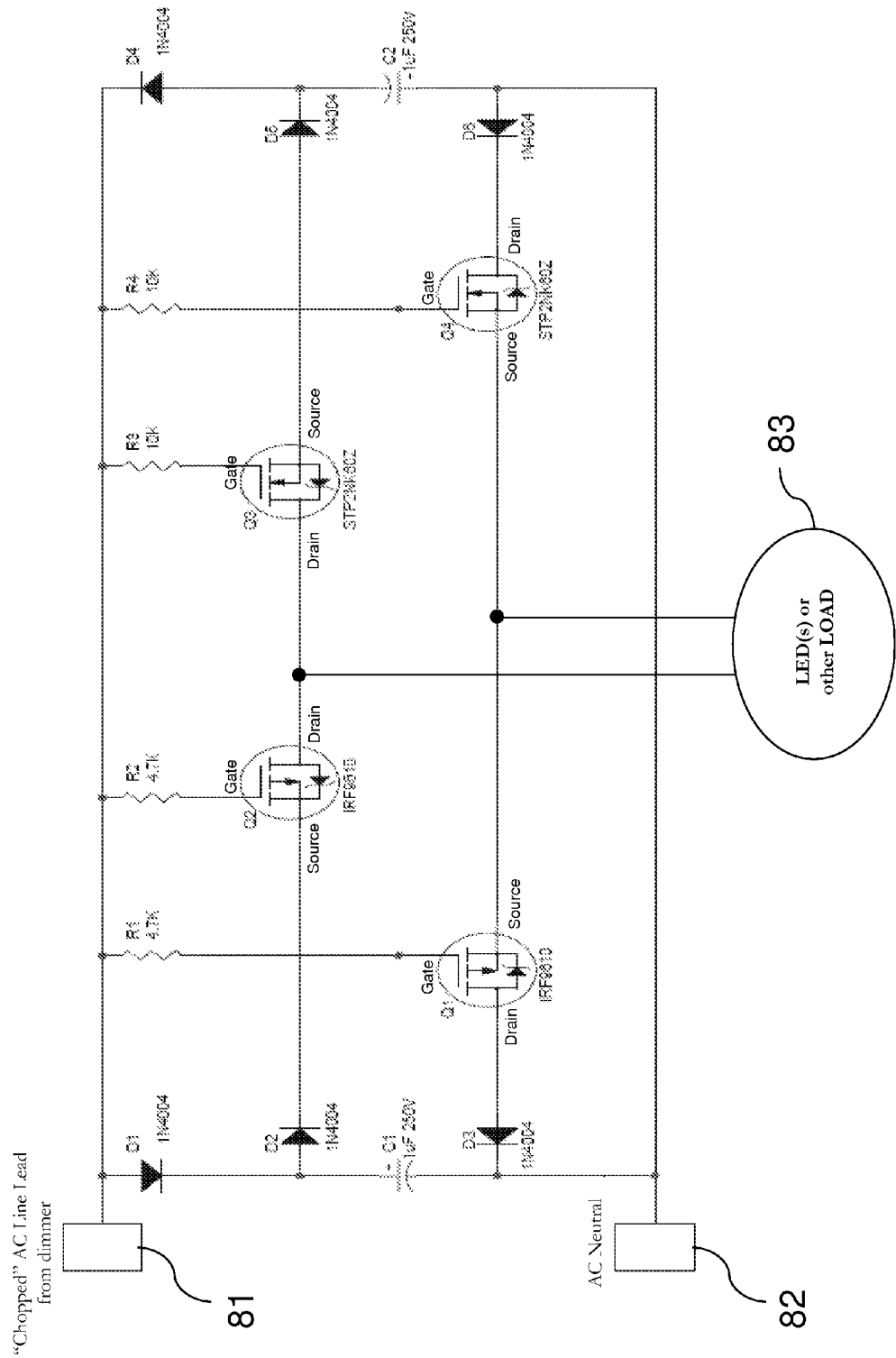
Figure 9:
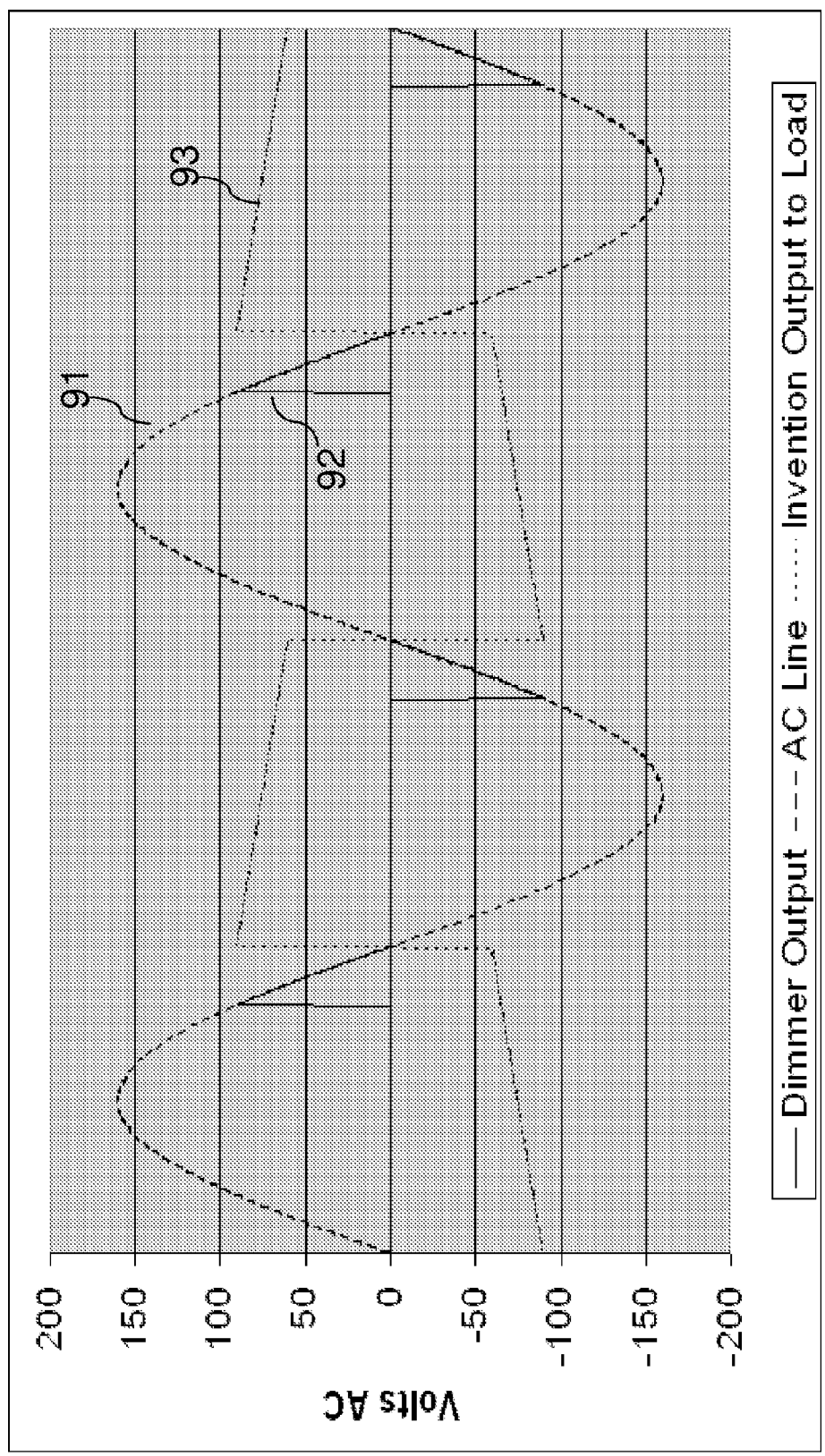

FIG. 2 (from U.S. Pat. No. 7,102,902 to Brown/Lodhie (2006)) shows the firing points of a TRIAC within a modern TRIAC based dimmer with the switch in a "dim" setting FIG. 3 shows the resulting "chopped" AC waveform as it is output from the TRIAC dimmer and sent to the load with the switch in a "dim" setting FIG. 4 (from U.S. Pat. No. 7,102,902 to Brown/Lodhie (2006)) shows a prior art diagram of where the prior art resides in an electrical installation FIG. 5 (from U.S. Pat. No. 7,102,902 to Brown/Lodhie (2006)) shows a prior art circuit FIG. 6 is a system level diagram of where one embodiment resides in an electrical installation FIG. 7 is a block diagram of one embodiment FIG. 8 is a schematic design of one embodiment using MOSFETs and capacitors FIG. 9 is a graph of a standard 60 Hz 120V AC sine wave, superimposed with the "chopped" output of a dimmer switch and the resulting output waveform from the embodiment shown in FIG. 8.

Figure 10:
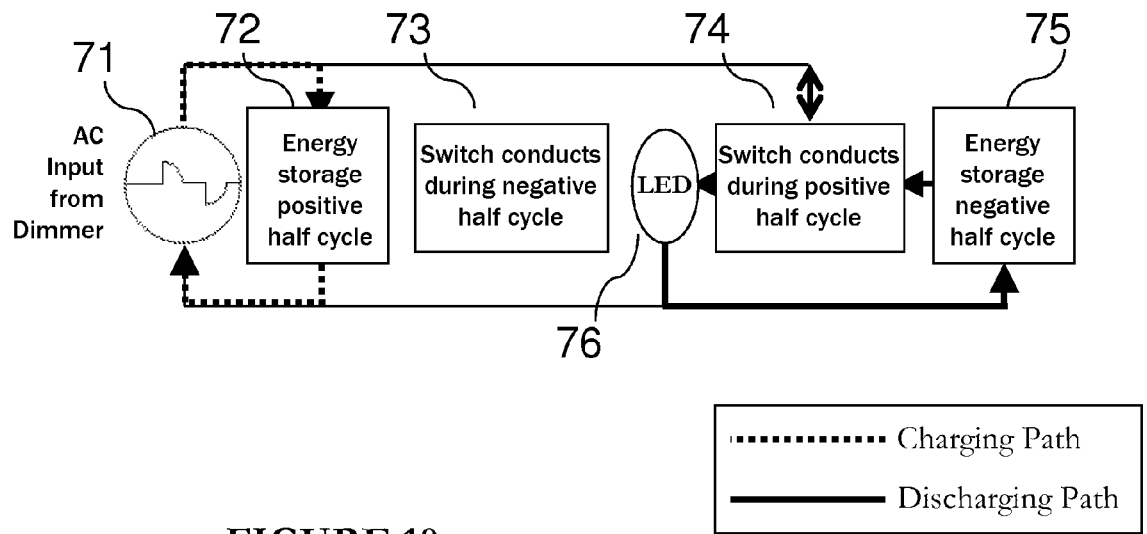
Figure 11:
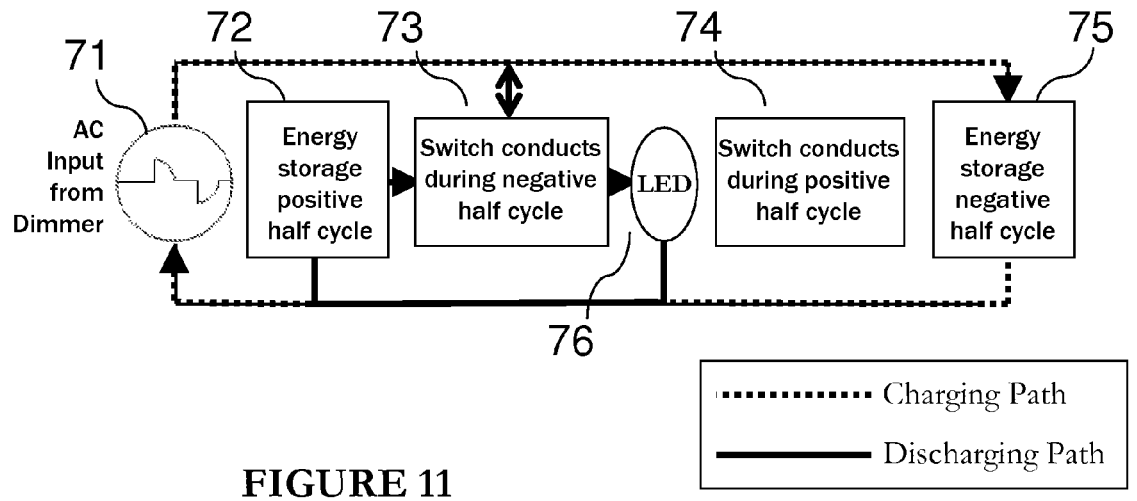
Figure 12:
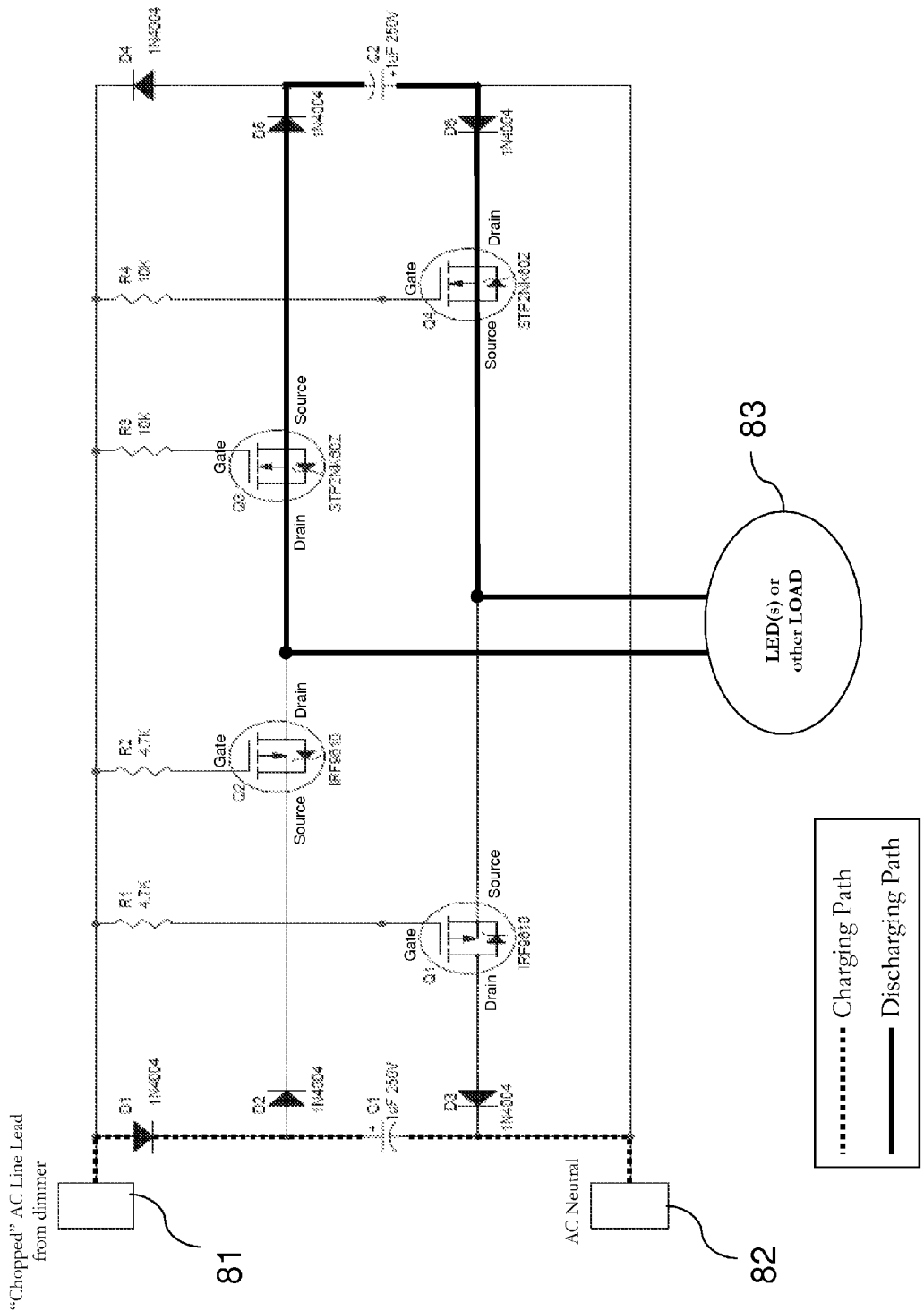
Figure 13:
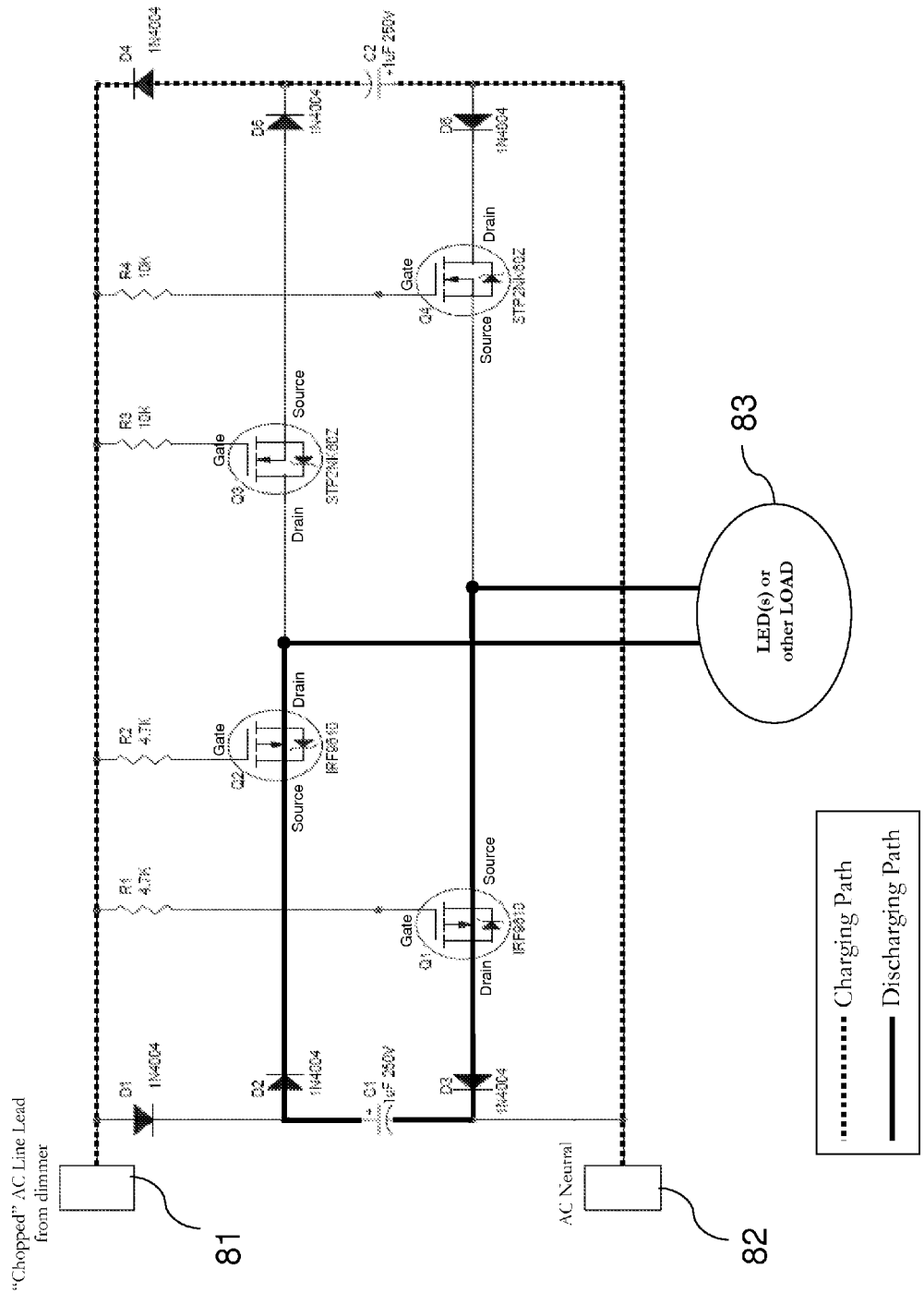

FIG. 10 is a power flow diagram for the positive half cycle of the AC waveform in the block diagram of one embodiment FIG. 11 is a power flow diagram for the negative half cycle of the AC waveform in the block diagram of one embodiment FIG. 12 is a power flow diagram for the positive half cycle of the AC waveform in one embodiment using MOSFETs and capacitors FIG. 13 is a power flow diagram for the negative half cycle of the AC waveform in one embodiment using MOSFETs and capacitors

DRAWINGS—REFERENCE NUMERALS

21—Prior art circuit location in installation
61—AC power source
62—Typical TRIAC dimmer switch
63—Load such as a light fixture
64—Location of one embodiment
65—Electrical load such as LED lamp
71—"Chopped" AC output from dimmer
72—Energy storage device
73—Semiconductor switch
74—Semiconductor switch
75—Energy storage device
76—Electrical load such as LED lamp
81—"Chopped" AC output line lead
82—AC Neutral lead
83—Electrical load such as LED lamp
D1—A first diode
D2—A second diode
D3—A third diode
D4—A fourth diode
D5—A fifth diode
D6—A sixth diode
C1—A first capacitor
C2—A second capacitor
Q1—A first transistor
Q2—A second transistor
Q3—A third transistor
Q4—A fourth transistor
R1—A first resistor
R2—A second resistor
R3—A third resistor
R4—A fourth resistor
91—AC power source waveform
92—"Chopped" AC output waveform
93—Resulting waveform from one embodiment

DETAILED DESCRIPTION—FIGS. 6, 7, 8

The system diagram shown in FIG. 6 illustrates one location of one embodiment in an electrical system. An AC line 61 is connected to a standard TRIAC dimmer switch 62. An electrical fixture 63 contains an electrical load 65. One embodiment resides within the electrical fixture 63 to allow for retrofit installations of new electrical fixtures without requiring an upgrade to existing wiring or the dimmer switch 62.

The block diagram illustrated in FIG. 7 is a blowup of 64 from FIG. 6 and shows the key components to one embodiment and how they are electrically connected.

A "Chopped" AC output line and neutral connection from the dimmer 71 is connected to an energy storage device for positive half cycle 72 and an energy storage device for negative half cycle 75.

The energy storage device for positive half cycle 72 is connected to the electrical load 76 via a semiconductor switch 73. The energy storage device for negative half cycle 75 is connected to the electrical load 76 via a semiconductor switch 74.

The semiconductor switch 73 triggering lead is connected to the hot lead of the "chopped" AC output 71 for control of the semiconductor switch 73 during the negative half cycle. The semiconductor switch 74 triggering lead is connected to the hot lead of the "chopped" AC output 71 for control of the semiconductor switch 74 during the positive half cycle.

One embodiment is shown in FIG. 8 using Metal-Oxide Semiconductor Field Effect Transistors (MOSFETs) (Q1, Q2, Q3, Q4) as the semiconductor switches (73, 74) and capacitors (C1, C2) as the energy storage devices (72, 75).

A "chopped" AC output line lead 81 is connected to the anode of a diode D1. The cathode of D1 is connected to the positive terminal of a capacitor C1. The negative terminal of capacitor C1 is connected to an AC Neutral lead 82. The "chopped" AC output line lead 81 is also connected to the cathode of a diode D4. The anode of D4 is connected to the negative terminal of a capacitor C2. The positive terminal of capacitor C2 is connected to AC Neutral 82.

The positive terminal of capacitor C1 is also connected via the anode of a diode D2 to the source electrode of a P channel MOSFET Q2. The negative terminal of capacitor C1 is also connected via a diode D3 to the drain electrode of a P channel MOSFET Q1.

The negative terminal of capacitor C2 is also connected via a diode D5 to the source electrode of an N channel MOSFET Q3. The positive terminal of capacitor C2 is also connected via a diode D6 to the drain electrode of an N channel MOSFET Q4.

The "chopped" AC output line lead 81 is connected to the gate electrodes of MOSFETs Q1 and Q2 via resistors R1 and R2 respectively. The "chopped" AC output line lead 81 is also connected to the gate electrodes of MOSFETs Q3 and Q4 via resistors R3 and R4 respectively.

The drain electrode of MOSFET Q2 and the drain electrode of MOSFET Q3 are tied together and are connected to one of the leads going to the electrical load 83. The source electrode of MOSFET Q1 and the source electrode of MOSFET Q4 are tied together and are connected to the other lead going to the electrical load 83.

Values of electrical components used in this embodiment are as follows:
C1: 250V, 1 uF
C2: 250V, 1 uF
D1: 400V, 1 A
D2: 400V, 1 A
D3: 400V, 1 A
D4: 400V, 1 A
D5: 400V, 1 A
D6: 400V, 1 A
Q1: −200V, 1.8 A P channel MOSFET (IRF9610)
Q2: −200V, 1.8 A P channel MOSFET (IRF9610)
Q3: 600V, 1.4 A N channel MOSFET (STP2NK60Z)
Q4: 600V, 1.4 A N channel MOSFET (STP2NK60Z)
R1: 4.7 k ohm, 0.5 W
R2: 4.7 k ohm, 0.5 W
R3: 10 k ohm, 0.5 W
R4: 10 k ohm, 0.5 W All of the above components are available from Digi-Key Corporation, Thief River Falls, Minn. The test electrical load used in this embodiment is Seoul Semiconductor Ltd part number AW2214, available from Mouser Electronics Corporation, Mansfield, Tex.

Note that the MOSFETs Q1, Q2, Q3, Q4 and diodes D1, D2, D3, D4, D5, D6 are all oversized in this embodiment and were used based on availability and cost at the time of construction. Proper sizing of all components can be calculated based on the size of the electrical load 83 attached to this embodiment by anyone skilled in the art.

Operation—FIGS. 9, 10, 11, 12, 13

The mode of operation is somewhat similar to a very simplified version of U.S. Pat. No. 5,146,395 to McKie (1992), relying on two energy storage devices, and operating in two distinct states. The oscillation between states is controlled by the natural line frequency of the incoming AC waveform, similar to the power supply control method illustrated in U.S. Pat. No. 7,199,562 to Muterspaugh (2007).

FIG. 10 illustrates the first state, which occurs during the positive half cycle of the AC waveform, which is when the dimmer output voltage is greater than 0V (as seen in FIGS. 1, 3). The energy storage device for the positive half cycle 72 draws energy in a positive current flow only from "Chopped" AC line and neutral leads 71. This charges the energy storage device off of the AC waveform output by the dimmer, to a voltage and energy level which varies based on the user input at the switch. Note that the semiconductor switch 73 does not conduct during this state, allowing the energy storage device for positive half cycle 72 to retain all charge.

Concurrently, the semiconductor switch 74, which conducts only during the positive half cycle, creates an energy path from the energy storage device for the negative half cycle 75 to the electrical load 76. As the energy storage device for negative half cycle 75 only charges during the negative half cycle from the "chopped" AC line and neutral leads 71, this creates an isolated path of energy from the energy storage device for the negative half cycle 75 into the electrical load 76, transferring energy stored during the previous alternate state.

FIG. 11 illustrates the second (alternate) state, which occurs during the negative half cycle of the AC waveform, which is when the dimmer output voltage is less than 0V (as seen in FIGS. 1, 3). The energy storage device for the negative half cycle 75 draws energy in a negative current flow only from "chopped" AC line and neutral leads 71. This charges the energy storage device off of the AC waveform output by the dimmer, to a voltage and energy level which varies based on the user input at the switch. Note that the semiconductor switch 74 does not conduct during this state, allowing the energy storage device for the negative half cycle 75 to retain all charge.

Concurrently, the semiconductor switch 73, which conducts only during the negative half cycle, creates an energy path from the energy storage device for the positive half cycle 72 to the electrical load 76. As the energy storage device for the positive half cycle 72 only charges during the positive half cycle from the "chopped" AC line and neutral leads 71, this creates an isolated path of energy from the energy storage device for the positive half cycle 72 into the electrical load 76, transferring energy stored during the previous first state.

Oscillation between the two states occurs at the natural line frequency of the incoming AC waveform, by linking the semiconductor switches 73 and 74 to the AC line lead 110. The semiconductor switch that conducts during the negative half cycle 73 conducts only when the voltage on the AC line lead 71 falls below 0V. Conversely, the semiconductor switch that conducts during the positive half cycle 74 conducts only when the voltage on the AC line lead 71 rises above 0V. Concurrently, the energy storage device for the positive half cycle 72 only charges during the positive half cycle while the energy storage device for the negative half cycle 75 only charges during the negative half cycle.

Hence, two distinct states are achieved:

A) Positive half cycle (FIG. 10): energy storage device for the positive half cycle 72 charges from the AC line lead 71 and energy storage device for the negative half cycle 75 delivers energy to the electrical load 76 via the semiconductor switch 74 that only conducts during the positive half cycle, resulting in two isolated energy pathways.

B) Negative half cycle (FIG. 11): energy storage device for the negative half cycle 75 charges from the AC line lead 71 and energy storage device for the positive half cycle 72 delivers energy to the electrical load 76 via the semiconductor switch 73 that only conducts during the negative half cycle, resulting in two isolated energy pathways.

In the embodiment shown in FIG. 8, the functions of the blocks in FIGS. 10, 11 are created using commercially available electronic components.

FIGS. 12 and 13 illustrate the positive and negative half cycle states (respectively) from FIGS. 10 and 11 using said commercially available components in this embodiment. The energy storage device 72 is created using capacitor C1 and diode D1, which draws energy in a positive current flow only from the AC line lead 81 during the positive half cycle. The energy storage device 75 is created using capacitor C2 and diode D2, which draws energy in a negative current flow only from the AC line lead 81 during the negative half cycle. The semiconductor switch block 73 is created using two P-channel MOSFETs Q1, Q2, and two diodes D2, D3, (required to counter the effect of P-channel MOSFETs' Q1, Q2 natural and undesired conductivity from drain to source). As Q1, Q2 are P-channel MOSFETs, they conduct from source to drain when a negative gate voltage is applied, and hence they both conduct only when the voltage from the AC line lead 81 is below 0V. The semiconductor switch block 74 is created using two N-channel MOSFETs Q3, Q4 and two diodes D5, D6 (required to counter the effect of N-channel MOSFETs' Q3, Q4 natural and undesired conductivity from source to drain). As Q3, Q4 are N-channel MOSFETs, they conduct from drain to source when a positive gate voltage is applied, and hence they both conduct only when the voltage from the AC line lead 81 is above 0V. Control of MOSFETs Q1, Q2, Q3, Q4 is achieved by tying the gate electrodes of said MOSFETs to AC line lead 81 via resistors R1, R2, R3, R4. These resistors limit the current flow to the gate electrode of the MOSFET to eliminate any consequential power draw from this embodiment while allowing just enough current to flow to operate MOSFETs Q1, Q2, Q3, Q4 quickly enough to achieve minimal on resistance during current flow. In short, the switching occurs very close to the zero crossing of the AC waveform so that minimal power is lost in the internal resistance of the MOSFETs and minimal heat is generated by this embodiment.

FIG. 12 illustrates the two isolated energy paths in this embodiment during the positive half cycle. FIG. 13 illustrates the two isolated energy paths in this embodiment during the negative half cycle.

Referring to FIG. 9, oscillation between these two states converts the waveform output of the TRIAC dimmer switch 92 (a duty cycle as a percentage of a complete sine wave) into a new AC waveform having average amplitude as a percentage of peak AC line voltage 93 proportional to the duty cycle percentage 92 of a complete sine wave 91. This proportion can be adjusted by proper selection of the capacity of the energy storage devices for the electrical load and the dimmer switch (such as the curve built into many commercially available dimmer switches to create a more linear dimming range) allowing one skilled in the art to provide smooth and linear dimming across the entire range of the user adjustable switch, without flicker or consequential use of energy in the conversion.

Conclusion, Ramifications, and Scope

Accordingly, the reader will see that at least one embodiment of this method for converting duty cycle TRIAC dimmer output waveforms into amplitude varying waveforms can be used to adapt existing dimmer switches to non-incandescent electrical loads to provide a smooth, linear, large range of dimming, and has the following additional advantages:

A) The flexibility to customize the energy storage device selection based on the electrical load so as to optimize said embodiment for inconsequential power usage during operation across the dimming range
B) With proper energy storage device sizing, change of voltage over time can be reduced, prolonging the life of electrical loads, including but not limited to incandescent fixtures, as the sudden turn-on and rapid voltage increase associated with a TRIAC dimmer is absorbed by the energy storage devices and delivered more smoothly to the load
C) No digital components required as operation relies solely on natural oscillation of incoming AC waveform, eliminating the need for secondary power conversion within electrical loads
D) Ability to retrofit existing fixture installations to prevent required substitution of existing dimmer switches, providing potential time and cost savings
E) Ability to capture leakage current from dimmer switch and ensure that load receives no power when dimmer is in the off position
F) Although one embodiment illustrated above shows the circuit installed at the electrical load point, another embodiment can be incorporated into a dimmer switch to enable it for use with a wider array of light fixtures, and allowing the dimmer switch to be marketed as such.

While my above description contains many specificities, these should not be construed as limitations on the scope of the invention, but rather as an exemplification of one embodiment thereof. Many other variations are possible. For example, the MOSFETs chosen as semiconductor switches can easily be replaced with other semiconductor switch technologies including but not limited to bipolar transistors, insulated-gate bipolar transistors, emitter-switched bipolar transistors, etc. Also, single energy storage devices may be replaced with a plurality of energy storage devices.

Alternative embodiments are possible to support different alternating current voltages and oscillating frequencies. Additional components may also be added to alter the frequency of oscillation between the two states of operation.

Thus, the scope of the embodiment should be determined by the appended claims and their legal equivalents, rather than by the examples given.

I claim:

1. A method of converting a duty cycle varied alternating current waveform input into an amplitude varied alternating current waveform output for an electrical load, wherein the average amplitude of said amplitude varied alternating current waveform output is proportional to the duty cycle of said duty cycle varied alternating current waveform input comprising:
    (a) providing a first energy storage device or plurality of energy storage devices,
    (b) providing a second energy storage device or plurality of energy storage devices identical to said first energy storage device or plurality of energy storage devices,
wherein the two energy storage devices are adapted to function repetitively in two states,
    A) in the first state, said first energy storage device or plurality of energy storage devices is coupled to said duty cycle varied alternating current waveform input to charge said first energy storage device or plurality of energy storage devices and said second energy storage device or plurality of energy storage devices is coupled to said electrical load, providing previously stored energy to said electrical load,
    B) in the second state, said second energy storage device or plurality of energy storage devices is coupled to said duty cycle varied alternating current waveform input to charge said second energy storage device or plurality of energy storage devices and said first energy storage device or plurality of energy storage devices is coupled to said electrical load, providing previously stored energy to said electrical load,
whereby an oscillation between said two states generates said amplitude varied alternating current waveform output.

2. The method of claim 1 wherein said oscillation between said two states is controlled by a plurality of semiconductor switches comprising:
    (a) providing a first semiconductor switch to couple said first energy storage device or plurality of energy storage devices to said electrical load,
    (b) providing a second semiconductor switch to couple said second energy storage or plurality of energy storage devices to said electrical load.

3. The method of claim 2 wherein said plurality of semiconductor switches is controlled by the oscillation in said duty cycle varied alternating current waveform input comprising:
    (a) enabling the conductivity of said first semiconductor switch to conduct energy from said first energy storage device or plurality of energy storage devices to said electrical load only when the varying voltage of said duty cycle varied alternating current waveform is less than zero volts,
    (b) enabling the conductivity of said second semiconductor switch to conduct energy from said second energy storage device or plurality of energy storage devices to said electrical load only when the varying voltage of said duty cycle varied alternating current waveform is greater than zero volts.

4. A circuit to convert a duty cycle varied alternating current waveform input into an amplitude varied alternating current waveform output for an electrical load, where the amplitude of said amplitude varied alternating current waveform output is proportional to the duty cycle of said duty cycle varied alternating current waveform input, the circuit comprising:
    (a) means of coupling said circuit to a duty cycle varied alternating current waveform input source providing a hot input lead and a neutral input lead,
    (b) the electrical load having a first input lead and a second input lead,
    (c) a plurality of capacitors as energy storage devices,
    (d) a plurality of transistors as semiconductor switches,
    (e) a plurality of diodes to isolate energy pathways,
    (f) a plurality of resistors to control said transistors,
    (g) a first capacitor having a positive lead and a negative lead, a first diode having an anode and a cathode, said first diode connected in series with said first capacitor such that said cathode of said first diode is connected to said positive lead of said first capacitor, said anode of said first diode is connected to said hot input lead, and said negative lead of said capacitor connected to said neutral input lead,
    (h) a second capacitor having a positive lead and a negative lead, a second diode having an anode and a cathode, said second diode connected in series with said second capacitor such that said anode of said second diode is connected to said negative lead of said second capacitor, said cathode of said second diode is connected to said hot input lead, and said positive lead of said second capacitor is connected to said neutral input lead, (i) a first transistor having a gate, a source, and a drain such that said drain of said first transistor is connected to an anode of a third diode where a cathode of said third diode is connected to said negative lead of said first capacitor, said source of said first transistor is connected to said first input lead of said electrical load, and said gate of said first transistor is connected via a first resistor to said hot input lead, (j) a second transistor having a gate, a source, and a drain such that said source of said second transistor is connected to a cathode of a fourth diode where an anode of said fourth diode is connected to said positive lead of said first capacitor, said drain of said second transistor is connected to said second input lead of said electrical load, and said gate of said second transistor is connected via a second resistor to said hot input lead, (k) a third transistor having a gate, a source, and a drain such that said source of said third transistor is connected to an anode of a fifth diode where a cathode of said fifth diode is connected to said negative lead of said second capacitor, said drain of said third transistor is connected to said second input lead of said electrical load, and said gate of said third transistor is connected via a third resistor to said hot input lead, (l) a fourth transistor having a gate, a source, and a drain such that said drain of said fourth transistor is connected to a cathode of a sixth diode where an anode of said sixth diode is connected to said positive lead of said second capacitor, said source of said fourth transistor is connected to said first input lead of said electrical load, and said gate of said fourth transistor is connected via a fourth resistor to said hot input lead.

* * * * *